(12) United States Patent
Zhang et al.

(10) Patent No.: US 9,831,826 B2
(45) Date of Patent: Nov. 28, 2017

(54) DISPLAY SUBSTRATE AND DISPLAY DEVICE

(71) Applicant: BOE TECHNOLOGY GROUP CO., LTD., Beijing (CN)

(72) Inventors: Chen Zhang, Beijing (CN); Fei Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 205 days.

(21) Appl. No.: 14/415,635

(22) PCT Filed: Apr. 21, 2014

(86) PCT No.: PCT/CN2014/075813
§ 371 (c)(1),
(2) Date: Jan. 19, 2015

(87) PCT Pub. No.: WO2015/100884
PCT Pub. Date: Jul. 9, 2015

(65) Prior Publication Data
US 2015/0372639 A1    Dec. 24, 2015

(30) Foreign Application Priority Data

Dec. 31, 2013    (CN) .......................... 2013 1 0752866

(51) Int. Cl.
*H02J 7/00* (2006.01)
*H02S 40/38* (2014.01)
(Continued)

(52) U.S. Cl.
CPC .......... *H02S 40/38* (2014.12); *G02F 1/13306* (2013.01); *H02J 7/35* (2013.01); *G02F 2001/13324* (2013.01)

(58) Field of Classification Search
CPC ............ H02J 7/0068; H02J 7/35; H02S 40/38
(Continued)

(56) References Cited

U.S. PATENT DOCUMENTS

2009/0219273 A1* 9/2009 Nathan ............... H01L 27/3227
345/211
2011/0249219 A1* 10/2011 Evans ................. G02F 1/13306
349/63
(Continued)

FOREIGN PATENT DOCUMENTS

| CN | 1506925 A | 6/2004 |
| CN | 101813849 A | 8/2010 |

(Continued)

OTHER PUBLICATIONS

2nd office action issued in Chinese application No. 201310752886.0 dated Feb. 1, 2016.
(Continued)

*Primary Examiner* — Edward Tso
*Assistant Examiner* — Aaron Piggush
(74) *Attorney, Agent, or Firm* — Nath, Goldberg & Meyer; Joshua B. Goldberg

(57) ABSTRACT

The present invention provides a display substrate and a display device, belonging to the field of display technology. In view of the problem that the energy-saving techniques of an existing liquid crystal display have yet to be further developed and improved, the present invention provides the display substrate comprising photoelectric conversion element for converting light energy into electric energy and the display device including the above display substrate. According to the display substrate and the display device of the present invention, renewable light energy is converted into electric energy by using the photoelectric conversion elements to supply power to the display device, so that the
(Continued)

energy consumption of an external power supply by the display device may be reduced, and further, non-renewable resources may be favorably saved.

16 Claims, 2 Drawing Sheets

(51) Int. Cl.
*H02J 7/35* (2006.01)
*G02F 1/133* (2006.01)

(58) Field of Classification Search
USPC .................. 320/101, 107, 132; 136/244, 252
See application file for complete search history.

(56) References Cited

U.S. PATENT DOCUMENTS

2011/0267324 A1* 11/2011 Stephens .............. G09G 3/3611
345/207
2015/0034911 A1* 2/2015 Liu ....................... H01L 31/053
257/40

FOREIGN PATENT DOCUMENTS

| CN | 102810551 A | 12/2012 |
| CN | 103135282 A | 6/2013 |
| CN | 103246098 A | 8/2013 |
| CN | 103258841 A | 8/2013 |
| CN | 103474452 A | 12/2013 |
| CN | 103728753 A | 4/2014 |
| JP | 8-94992 | 4/1996 |
| JP | H09197370 A | 7/1997 |
| JP | 2000019983 A | 1/2000 |

OTHER PUBLICATIONS

Search Report issued in International Application No. PCT/CN2014/075813, thirteen (13) pages.

Form PCT/ISA/237 issued in international application No. PCT/CN2014/075813.

1st office action issued in Chinese application No. 201310752886.0 dated Sep. 25, 2015.

* cited by examiner

DISPLAY SUBSTRATE AND DISPLAY DEVICE

This is a National Phase Application filed under 35 U.S.C. 371 as a national stage of PCT/CN2014/075813, filed Apr. 21, 2014, and claims priority benefit from Chinese Application No. 201310752886.0, filed Dec. 31, 2013, the content of each of which is hereby incorporated by reference in its entirety.

FIELD OF THE INVENTION

The present invention belongs to the field of display technology, and in particular relates to a display substrate and a display device.

BACKGROUND OF THE INVENTION

Displays, particularly liquid crystal displays, are widely applied due to its excellent quality. With the tide of tablets, the liquid crystal display ownership is quickly increasing. Obviously, as the number of the liquid crystal displays increases, energy consumption increases accordingly. Under the background that non-renewable energy sources, represented by traditional fossil resources like coal and petroleum, are gradually getting strained, energy conservation of liquid crystal display products supplied with power generated by means of these traditional energy sources is increasingly necessary. To reduce the power consumption of the liquid crystal displays is of great significance for saving energy and promoting environmental protection. National standards of "Energy Efficiency Limits and Energy Efficiency Rating of Computer Displays" in China forcibly specify the power consumption of the liquid crystal display products.

The energy conservation of the liquid crystal display products is mainly realized by using a new technology to reduce the power consumption of components. For example, the power consumption of a liquid crystal display product can be reduced by substituting a traditional cold cathode fluorescence lamp with a light emitting diode with relatively low working voltage to serve as a backlight, using a new transparent material to improve the light transmittance of a display panel, etc.

Inventors discover that there are at least the following problems in the prior art: reducing the energy consumption of the liquid crystal display products by using a new technology is generally restricted by the formation, development and maturity of the new technology. In addition, the energy-saving techniques of the liquid crystal display products have yet to be further developed and improved.

SUMMARY OF THE INVENTION

In view of the problem that the energy-saving techniques of an existing liquid crystal display have yet to be further developed and improved, the present invention provides a display substrate and a display device, which realize energy conservation by means of effectively utilizing renewable new energy, which takes the place of the traditional energy, to supply power to a display, rather than reducing the energy consumption of a display product. Specifically, in the display substrate and the display device according to the present invention, renewable solar energy is converted into electric energy by using photoelectric conversion elements to supply power to the display device, so that the power energy of the external power supply, which generates electricity by means of the traditional energy, consumed by the display device is reduced, and thus non-renewable energy may be favorably saved.

The technical solutions adopted for solving such technical problem involve a display substrate which includes photoelectric conversion element for converting light energy into electric energy.

Preferably, a plurality of display units for display are mounted on the display substrate, and the photoelectric conversion element is arranged between the display units.

Further preferably, a black matrix is arranged between the display units, and the photoelectric conversion element is arranged on the black matrix.

Preferably, the photoelectric conversion element is a solar cell.

Preferably, the photoelectric conversion elements include a plurality of the photoelectric conversion elements arranged in an array, and the photoelectric conversion elements in each row or each column are connected in series.

The display substrate of the present invention includes the photoelectric conversion element for converting light energy into electric energy, since the photoelectric conversion element can convert light energy into electric energy, power may be supplied to a display device, and the energy consumption of an external power supply due to the display device is further reduced. Moreover, the light energy is renewable energy, and thus supplying power by means of conversion of light energy not only saves traditional energy but also eliminates environmental pollution caused by generating power with the traditional energy.

The technical solutions adopted for solving such technical problem involve a display device, including the above-mentioned display substrate and an electric energy storage unit, wherein the photoelectric conversion element is connected with the electric energy storage unit so that the converted electric energy is stored in the electric energy storage unit, and the electric energy storage unit supplies power to the display device by using the stored electric energy.

Preferably, the display device further includes a power supply control unit connected with the electric energy storage unit and an external power supply, wherein the power supply control unit is configured to control the external power supply or the electric energy storage unit to supply power to the display device.

Further preferably, the power supply control unit includes a real-time monitoring unit which monitors the working state of the display device and the amount of electricity stored in the electric energy storage unit in real time, and the power supply control unit controls the power supply states of the external power supply and the electric energy storage unit to the display device in real time according to monitoring results of the real-time monitoring unit.

Further preferably, the power supply control unit further includes an energy-saving unit which is configured to prolong the service life of the electric energy storage unit.

Preferably, the electric energy storage unit includes a storage battery.

The display device of the present invention includes the above-mentioned display substrate, and thus the power energy of the external power supply consumed by the display device is reduced and then the cost is reduced.

Figure 1:
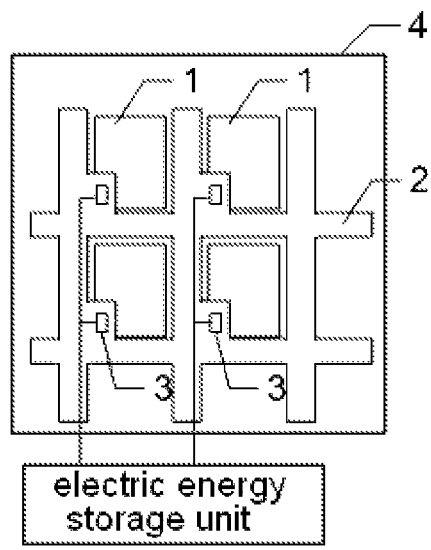
FIG. 1 is a schematic diagram of a structure of a display substrate in Embodiment 1 of the present invention.

Reference numerals: 1, display unit; 2, black matrix; 3, photoelectric conversion element; 4, display substrate; E1, converted electric energy; E2, stored electric energy; E3, external electric energy; S1, electric energy storage unit control signal; S1', external power supply control signal; S2, electricity storage state signal; S3, working state signal.

DETAILED DESCRIPTION OF THE EMBODIMENTS

To make those skilled in the art better understand the technical solutions of the present invention, the present invention will be further described in detail below in combination with the accompanying drawings and specific implementations.

Embodiment 1

Figure 2:
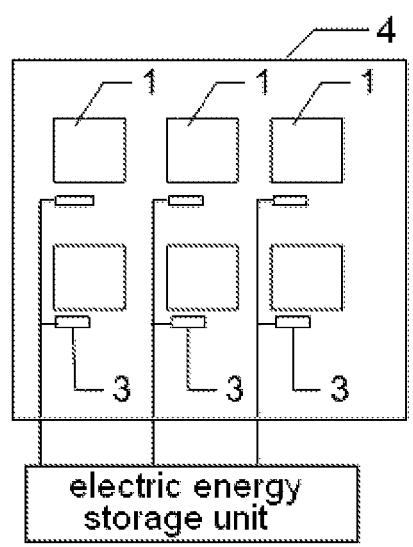
FIG. 2 is a schematic diagram of another structure of the display substrate in Embodiment 1 of the present invention.
Figure 3:
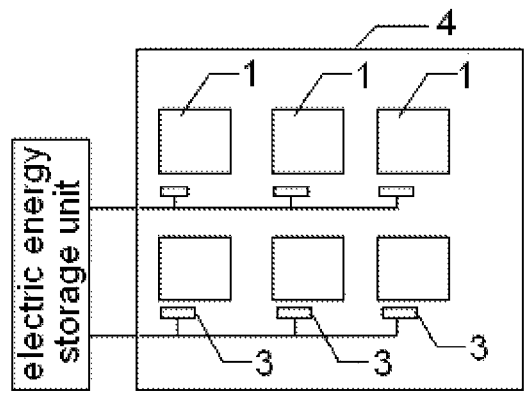
FIG. 3 is a schematic diagram of a further structure of the display substrate in Embodiment 1 of the present invention.

This embodiment provides a display substrate, which may be used for manufacturing a display device. As shown in FIGS. 1 to 3, the display substrate 4 may include photoelectric conversion element(s) 3 for converting light energy into electric energy.

A plurality of display units 1 (e.g. when the display device is a liquid crystal display device, the display units 1 correspond to areas where pixel electrodes are located; when the display device is an organic light-emitting display device, the display units 1 correspond to light emitting areas) for display are mounted on the display substrate 4. As shown in FIGS. 2 and 3, certain gaps (for arranging gate lines, data lines and the like) are inevitably formed between the mounted display units 1. The photoelectric conversion elements 3 are arranged in the gaps between the display units 1 and used for converting absorbed external light energy into electric energy (as for the liquid crystal display device, the photoelectric conversion elements 3 may also be used for converting part of light energy of a backlight of the device into electric energy), without affecting normal display of the display units 1.

Further preferably, as shown in FIG. 1, the display substrate 4 also includes a black matrix 2 arranged between the display units 1, and the photoelectric conversion elements 3 are arranged on the black matrix 2. With the photoelectric conversion elements 3 arranged on the black matrix 2 among the display units 1, the photoelectric conversion elements 3 can absorb external light (e.g. back light of the display device, sunlight, or the like) so as to convert the light energy into electric energy, and in the meanwhile, the photoelectric conversion elements 3 also have the same shading effect as the black matrix 2.

It could be understood that, the configuration that the photoelectric conversion elements 3 are arranged in the gaps between the display units 1 is not restrictive. Alternatively, the purpose of the present invention may also be realized by arranging the photoelectric conversion elements on the display units, but such arrangement would reduce the aperture ratio of the display units, and consequently the display quality of the display device is impaired.

Needless to say, it is also feasible that the photoelectric conversion elements 3 are arranged outside the display device, but the appearance effect of the display device to be light and thin may be affected.

The photoelectric conversion elements 3 are preferably solar cells.

The solar cells convert the light energy of sunlight into electric energy by using the photoelectric effect of PN junctions of semiconductors. Materials capable of exhibiting the photoelectric effect include monocrystalline silicon, polycrystalline silicon, amorphous silicon, gallium arsenide, copper indium selenide and the like. The principle that light energy is converted into electric energy will be described by taking a silicon semiconductor as an example, but the described specific example does not mean to limit the semiconductor materials and structures. Each silicon atom has four electrons, and if an atom with five electrons (such as a phosphorus atom) is doped into pure silicon, an electronegative N-type semiconductor is formed; and if an atom with three electrons (such as a boron atom) is doped into pure silicon, an electropositive P-type semiconductor is formed. When the P-type and N-type semiconductors are combined together, a potential difference occurs at the contact surface therebetween. After light is shone upon the PN junctions, holes move from an N pole area to a P pole area, and electrons move from the P pole area to the N pole area, so that current is formed. The current flows through an external circuit to produce certain output power.

In this embodiment, the photoelectric conversion elements 3 are solar cells, and each solar cell has a multilayer structure which generally includes an anode, P-type and N-type semiconductors and a cathode. In practical production, a hole injection layer, an electron injection layer, a hole buffer layer, an electron buffer layer and the like are always added. When light is shone upon the PN junctions, the PN junctions produce the photoelectric effect to convert light energy into electric energy. The electric energy is output or stored in an electric energy storage unit through a conducting wire, and the electric energy storage unit supplies power to the display device. In this way, the effect of reducing the energy consumption of an external power supply is achieved.

Preferably, as shown in FIGS. 1 to 3, a plurality of photoelectric conversion elements 3 are arranged in an array, and the photoelectric conversion elements 3 in each row or each column are connected in series. Obviously, the photoelectric conversion elements 3 are arranged in an array and connected in series, so that lead wires can be easily arranged to connect each photoelectric conversion element 3 to the electric energy storage unit of the display device, so as to lead out the electric energy and supply the same to the display device, and therefore wiring on the display substrate 4 becomes simpler.

Preferably, the display substrate in this embodiment may be an array substrate or a color filter substrate, that is to say, the purpose of the present invention may be realized by arranging the photoelectric conversion elements 3 on the array substrate or the color filter substrate.

The display substrate 4 of the present invention includes the photoelectric conversion element(s) 3 capable of converting light energy (including sunlight, ambient light, light emitted from the display device and the like) into electric energy, and the electric energy obtained through conversion by the photoelectric conversion element(s) 3 is supplied to the display device, so that the energy consumption of the external power supply by the display device is reduced. Moreover, the light energy is renewable energy, and when the solar energy is utilized, traditional energy is saved and environmental pollution is eliminated.

Embodiment 2

This embodiment provides a display device, including the display substrate in Embodiment 1 and an electric energy storage unit. Needless to say, the display device also includes known structures such as display units, a drive circuit and the like, it is used as an example for illustration below that the display units serve as a main energy consumption unit, and thus supplying power to the display device also means supplying power to the display units. However, it should be understood that, the display device may further include other energy consumption units such as various detection control units, which are not described in detail herein.

Figure 4:
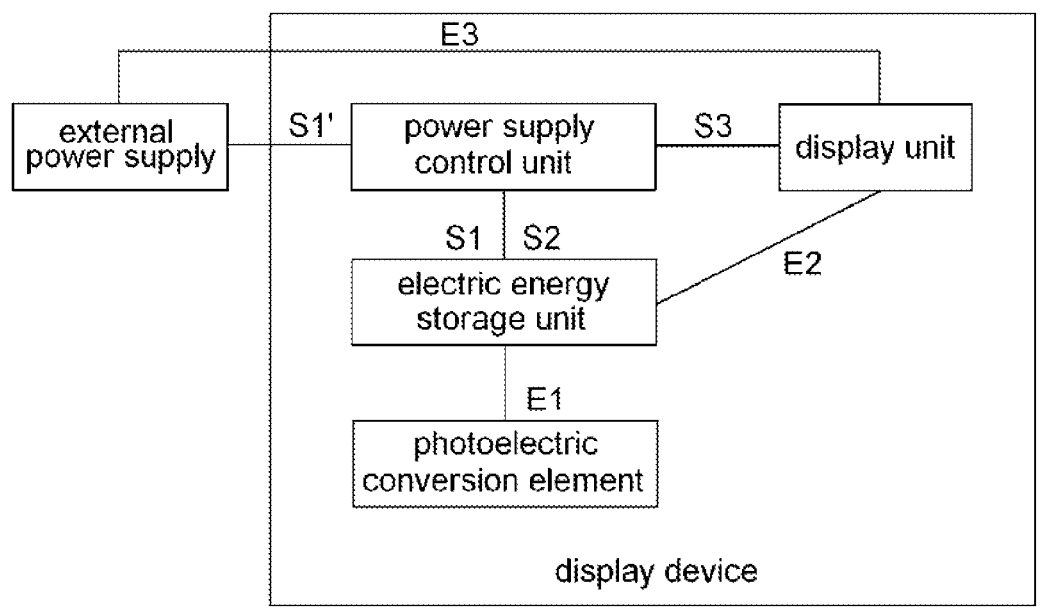
FIG. 4 is a functional block diagram of a display device in Embodiment 2 of the present invention.

In the display device of this embodiment, as shown in FIG. 4, the photoelectric conversion elements are connected with the electric energy storage unit which is configured to store converted electric energy E1 obtained through conversion by the photoelectric conversion elements therein as stored electric energy E2, and the electric energy storage unit supplies power to the display device by using the stored electric energy E2. That is, the electric energy storage unit is directly used as a working power supply to supply power to the display device.

Preferably, as shown in FIG. 4, the display device further includes a power supply control unit. The power supply control unit is connected with the electric energy storage unit and an external power supply, and is configured to send an electric energy storage unit control signal S1 to the electric energy storage unit, or send an external power supply control signal S1' to the external power supply, so as to control the electric energy storage unit to supply the stored electric energy E2 to the display device, or control the external power supply to supply the external electric energy E3 to the display device, thus controlling power supply to the display device.

Further preferably, the power supply control unit may further include a real-time monitoring unit (not shown in FIG. 4), the real-time monitoring unit is connected with the display units and the electric energy storage unit of the display device and configured to acquire a working state signal S3 from the display units and acquire an electricity storage state signal S2 from the electric energy storage unit so as to monitor the working state of the display device and the amount of electricity stored in the electric energy storage unit in real time, and the power supply control unit controls the power supply states of the external power supply and the electric energy storage unit to the display device in real time according to the monitoring results of the real-time monitoring unit.

Specifically but non-restrictively, the power supply states of the external power supply and the electric energy storage unit may be controlled in real time through software as follows:

when the working state signal S3 acquired by the power supply control unit from the display units indicates that the display device is on standby, the power supply control unit controls the electric energy storage unit to supply power to the display device by using the stored electric energy E2, and controls the external power supply not to supply power to the display device;

when the working state signal S3 indicates that the display device is lit up to work, the electric energy storage unit continues supplying the stored electric energy E2 to the display device, and the external power supply does not supply power to the display device; when the electricity storage state signal S2 by the power supply control unit acquired from the electric energy storage units indicates that the stored electric energy is lower than a set value, the power supply control unit controls the electric energy storage unit to stop supplying power to the display device, and controls the external power supply by means of the external power supply control signal S1 to supply the external electric energy E3 to the display device; the electric energy storage unit is charged by using the converted electric energy E1 from the photoelectric conversion elements; and when the electricity storage state signal S2 acquired by the power supply control unit from the electric energy storage unit indicates that the electric energy storage unit is fully charged, the power supply control unit controls the electric energy storage unit to supply power to the display device, and controls the external power supply to stop supplying power.

By adopting such control method, the electric energy converted from the light energy may be sufficiently utilized to supply power to the display device, so that the energy of the external power supply consumed by the display device is reduced. Meanwhile, the external power supply is used when the amount of electricity in the electric energy storage unit is low, so that stable working state of the display device is ensured.

Further preferably, the power supply control unit further includes an energy-saving unit such as a charge/discharge equalization energy-saving circuit, an over-discharge protection circuit or an over-charge protection circuit, which is configured to equalize charge and discharge of the electric energy storage unit and prevent a phenomenon such as over-charge or over-discharge, so as to favorably save energy and prolong the service life of the electric energy storage unit.

In this embodiment, preferably, the electric energy storage unit includes a storage battery. The photoelectric conversion elements 3 convert solar energy or other light energy into electric energy, and the obtained electric energy is stored in the storage battery. The storage battery may be recharged, and is thus convenient for reuse.

The display device of this embodiment includes the display substrate in Embodiment 1, and thus the display device saves more power and the cost is reduced. Moreover, the display device further includes the power supply control unit for controlling the electric energy storage unit or the external power supply to supply power to the display device, so that the display device may obtain a more stable working voltage or current, the power supply to the display device is less likely to be affected by external factors (e.g. factors such as presence or absence of sunlight, presence or absence of sufficient sunlight, and the like), and the working state of the display device is more stable.

Preferably, the display device in this embodiment is a liquid crystal display device or an organic light emitting diode display device. In addition, the display device may also be any product or component with a display function, such as electronic paper, a mobile phone, a tablet computer, a television, a display, a notebook computer, a digital photo frame, a navigator or the like.

It could be understood that, the above implementations are merely exemplary implementations adopted for explaining the principle of the present invention, but the present invention is not limited thereto. Various variations and improvements may be made by those of ordinary skill in the art without departing from the spirit and essence of the present invention, and these variations and improvements are regarded within the protection scope of the present invention.

The invention claimed is:

1. A display substrate, comprising photoelectric conversion element for converting light energy into electric energy; wherein a plurality of display units for display are mounted on the display substrate in a manner separating the display units in a horizontal direction to form horizontal gaps therebetween, and the photoelectric conversion element is arranged between the display units, such that the photoelectric conversion element is provided only in the horizontal gaps between the plurality of display units.

2. The display substrate of claim 1, further comprising a black matrix arranged between the display units, wherein the photoelectric conversion element is arranged on the black matrix.

3. The display substrate of claim 1, wherein the photoelectric conversion element is a solar cell.

4. The display substrate of claim 1, comprising a plurality of the photoelectric conversion elements, wherein the plurality of the photoelectric conversion elements are arranged in an array, and the photoelectric conversion elements in each row or each column of the array are connected in series with each other.

5. The display substrate of claim 2, comprising a plurality of the photoelectric conversion elements, wherein the plurality of the photoelectric conversion elements are arranged in an array, and the photoelectric conversion elements in each row or each column of the array are connected in series with each other.

6. The display substrate of claim 3, comprising a plurality of the photoelectric conversion elements, wherein the plurality of the photoelectric conversion elements are arranged in an array, and the photoelectric conversion elements in each row or each column of the array are connected in series with each other.

7. A display device, comprising the display substrate of claim 1 and an electric energy storage unit, wherein the photoelectric conversion element is connected with the electric energy storage unit, the electric energy obtained through conversion by the photoelectric conversion elements is stored in the electric energy storage unit, and the electric energy storage unit is configured to supply power to the display device.

8. The display device of claim 7, wherein the display substrate further comprises a black matrix arranged between the display units, wherein the photoelectric conversion element is arranged on the black matrix.

9. The display device of claim 7, wherein the photoelectric conversion element is a solar cell.

10. The display device of claim 7, wherein the display substrate comprises a plurality of the photoelectric conversion elements, wherein the plurality of the photoelectric conversion elements are arranged in an array, and the photoelectric conversion elements in each row or each column of the array are connected in series with each other.

11. The display device of claim 8, wherein the display substrate comprises a plurality of the photoelectric conversion elements, wherein the plurality of the photoelectric conversion elements are arranged in an array, and the photoelectric conversion elements in each row or each column of the array are connected in series with each other.

12. The display device of claim 9, wherein the display substrate comprises a plurality of the photoelectric conversion elements, wherein the plurality of the photoelectric conversion elements are arranged in an array, and the photoelectric conversion elements in each row or each column of the array are connected in series with each other.

13. The display device of claim 7, further comprising a power supply control unit, which is connected with the electric energy storage unit and an external power supply and configured to control the electric energy storage unit or the external power supply to supply power to the display device.

14. The display device of claim 13, wherein the power supply control unit comprises a real-time monitoring unit which monitors a working state of the display device and the amount of electricity stored in the electric energy storage unit in real time, and the power supply control unit controls power supply states of the external power supply and the electric energy storage unit to the display device in real time according to monitoring results of the real-time monitoring unit.

15. The display device of claim 13, wherein the power supply control unit further comprises an energy-saving unit which is configured to prolong the service life of the electric energy storage unit.

16. The display device of claim 7, wherein the electric energy storage unit includes a storage battery.

* * * * *